United States Patent
Tsai

(10) Patent No.: US 8,443,016 B2
(45) Date of Patent: May 14, 2013

(54) METHOD AND APPARATUS FOR APPROXIMATING AN UPPER-BOUND LIMIT FOR AN ABSOLUTE VALUE OF A COMPLEX NUMBER OR NORM OF A TWO-ELEMENT VECTOR

(75) Inventor: Kuo-Shih Tsai, Hsin-Chu (TW)

(73) Assignee: Himax Technologies Limited, Tainan (TW)

( * ) Notice: Subject to any disclaimer, the term of this patent is extended or adjusted under 35 U.S.C. 154(b) by 1162 days.

(21) Appl. No.: 11/971,148

(22) Filed: Jan. 8, 2008
(Under 37 CFR 1.47)

(65) Prior Publication Data
US 2009/0177723 A1    Jul. 9, 2009

(51) Int. Cl.
*G06F 7/00*    (2006.01)
(52) U.S. Cl. .................. 708/200; 708/201; 708/207
(58) Field of Classification Search .......... None
See application file for complete search history.

(56) References Cited

U.S. PATENT DOCUMENTS

| | | | |
|---|---|---|---|
| 4,747,067 A * | 5/1988 | Jagodnik, Jr. et al. | 708/517 |
| 5,521,943 A | 5/1996 | Dambacher | |
| 6,411,978 B1 | 6/2002 | Naveh et al. | |
| 2002/0147751 A1 * | 10/2002 | Goel et al. | 708/201 |
| 2004/0167954 A1 * | 8/2004 | Griessing | 708/552 |

* cited by examiner

*Primary Examiner* — Michael D Yaary
(74) *Attorney, Agent, or Firm* — Baker & McKenzie LLP

(57) ABSTRACT

A method for approximating an upper bound limit for the absolute value of a complex number or the norm of a two-element vector is disclosed. An upper bound approximation algorithm is used to minimize software implementation efforts and make the hardware implementation less expensive. The hardware implementation of the upper bound approximation algorithm only requires a multiplier element and an adder element. Therefore, this algorithm can be implemented anywhere in a digital signal processing apparatus without increasing cost significantly. Moreover, the hardware employing the present invention can be implemented in a pipeline architecture configuration to achieve a real time function in digital audio or digital video applications.

19 Claims, 3 Drawing Sheets

METHOD AND APPARATUS FOR APPROXIMATING AN UPPER-BOUND LIMIT FOR AN ABSOLUTE VALUE OF A COMPLEX NUMBER OR NORM OF A TWO-ELEMENT VECTOR

FIELD OF THE INVENTION

The present invention is related to the field of utilizing mathematical or numerical analysis to approximate measurements in digital processing and more particularly to methods and apparatuses for the implementation of digital audio and/or video devices.

BACKGROUND OF THE INVENTION

As the semiconductor industry continues to rapidly improve silicon chip performance, new digital processing applications have been developed to take advantage of the increase in processing speed. For example, traditional radio signal transmission methods that utilize analog signal processing techniques to transmit analog radio signals in analog format have gradually been replaced by newer signal transmission methods that utilize digital signal processing techniques to convert the analog radio signals to binary code (signal digitization) prior to transmission. Surprisingly, even with the analog to binary conversion step (and its potential for introducing translational errors), radio signal transmission methods using digital signal processing techniques still have better results (e.g., higher fidelity, resistance to interference, etc.) than those methods that still utilize analog signal processing techniques. As a result, many new potential applications for digital signal processing have been proposed.

Digital broadcasting systems (e.g., Digital Audio Broadcasting (DAB) and Digital Video Broadcasting (DVB)), have already started replacing conventional analog broadcasting systems used by many broadcasters today. A DAB system transmits a plurality of digital stereo sound signals (that are in bit-synchronism with each other) in a Coded Orthogonal Frequency Division and Multiplexing (COFDM) signal packet using a plurality of individual synchronized transmitters. Under COFDM, the digital data stream of each stereo signal is divided, prior to transmission, into multiple sub-signals each of which is separately transmitted by a signal carrier. After the sub-signals are received by a receiver, they are re-combined to convey the information held in the original digital stereo signal. DAB systems developed for audio broadcasting exhibit good signal transmission characteristics as they minimize distortions of the radio signals due to transmission distance and external interference.

In U.S. Pat. No. 5,521,943 to Dambacher titled "COFDM combined encoder modulation for digital broadcasting sound and video with PSK, PSK/AM, and QAM techniques," a modulation method is disclosed that achieves dual capacity for each COFDM signal packet. A circuit configuration having dual IFFT (Inverse Fast Fourier Transform), D/A-conversion and I/Q-modulation (QAM) is implemented to transmit 8 phase shift keying (PSK) and 2 amplitude modulation (AM) signals. The disclosure of this reference is incorporated herein by reference as if set forth in full.

Referring to the DVB-T (DVB-Terrestrial) specification titled "ETSI EN 300 744 V1.5.1 (2004-06)," an Orthogonal Frequency Division and Multiplexing (OFDM) frame structure is introduced. The transmitted signal is organized into frames which consists of 68 OFDM symbols and has a duration time of Tf. Each symbol consists of a set of K=6,817 carriers or K=1,705 carriers and is transmitted with a duration Ts. The duration Ts is further comprised of a use interval with duration Tu and a guard interval with a duration $\Delta$. The carriers are indexed by k $\in$[K min;K max]. The disclosure of this reference is incorporated herein by reference as if set forth in full.

The emitted signal defined in the DVB-T specification is described by the following expression:

$$s(t) = \text{Re}\left\{e^{j2\pi f_c t} \sum_{m=0}^{\infty} \sum_{l=0}^{67} \sum_{K_{\min}}^{K_{\max}} c_{m,l,k} \times \psi_{m,l,k}(t)\right\}$$

where $$\psi_{m,l,k}(t) = e^{j2\pi k'(t-\Delta-l\times Ts - 68\times m \times Ts)/Tu}$$

while $$(l + 68 \times m) \times Ts \leq t \leq (l + 68 \times m + 1) \times Ts \text{ or else } \psi_{m,l,k}(t) = 0.$$

where:
k denotes the carrier number;
l denotes the OFDM symbol number;
m denotes the transmission frame number;
K is the number of transmitted carriers;
Ts is the symbol duration;
Tu is the inverse of the carrier spacing;
$\Delta$ is the duration of the guard interval;
fc is the central frequency of the radio frequency (RF) signal;
k' is the carrier index relative to the center frequency, k'=k−(Kmax+Kmin)/2;
$c_{m,0,k}$ complex symbol for carrier k of the Data symbol no. 1 in frame number m;
$c_{m,1,k}$ complex symbol for carrier k of the Data symbol no. 2 in frame number m;
$c_{m,67,k}$ complex symbol for carrier k of the Data symbol no. 68 in frame number m; and
the $c_{m,l,k}$ values are normalized modulation values.

The equation presented above can be further simplified for the emitted signal during the period between t=0 to t=Ts as described by the following expression:

$$s(t) = \text{Re}\left\{e^{j2\pi f_c t} \sum_{K_{\min}}^{K_{\max}} c_{0,0,k} \times e^{j2\pi k'(t-\Delta)/Tu}\right\}$$

with $k' = k - (K\max + K\min)/2$.

This simplified equation resembles the following inverse Discrete Fourier Transform (DFT) expression:

$$X_n = \frac{1}{N}\sum_{q=0}^{N-1} X_q e^{j2\pi nq/N}.$$

Various efficient Fast Fourier Transform (FFT) algorithms exist to perform DFT and its inverse IDFT. An implementation of a DVB-T modulator can also be used the perform an IFFT to generate N samples Xn. A DVB signal is coded and interweaved in the early stage, then, mapped and inserted with parameter signals that are modulated by the OFDM specification as defined by the standard. Finally, the digitally processed information is transmitted via the RF front end block and broadcast through the air.

FFT algorithms are not only employed in digital broadcasting systems, but also in digital signal processors, which use FFT algorithms to transfer discrete time signals from a time domain to a frequency domain. A method termed reverse transformation also exists to reverse the FFT transfer process by, transferring discrete time signals from a frequency domain to a time domain.

As used herein, complex numbers are numbers with the form a+ib where a and b are real numbers and i represents the square root of negative number. Any complex number to a complex power also results in a complex number. Each complex number has its own position on the complex plane, which has a real axis and an imaginary axis. A complex number can be represented by polar coordinates with a modulus and an argument where the modulus is the distance to the origin of the complex plane and the argument is the angular coordinate. Modulus and argument are sometimes also called amplitude and phase, especially with regards to Fourier Transforms used in electronic components and devices. Thus, a complex number a+ib can also be represented by the exponential form $re^{i\Phi}$ where e is the number 2.71828, r is the modulus and $\Psi$ is the argument from its representation in polar coordinates. Moreover, a complex number a+ib can be written as $r*(\cos(\Psi)+i*\sin(\Psi))$ which means that $e^{ix}=\cos(x)+i\cdot\sin(x)$.

In electronic communication systems, both the "real" and "imaginary" (i.e., phase of the signal) parts of a signal are processed. Fourier Transforms are easily applied against communication signals that are exponential forms of complex numbers. For example, the continuous Fourier Transform function G(t) in time domain is defined as:

$$G(f) = \int_{-\infty}^{\infty} g(t)e^{-2\pi i ft} dt$$

and the inverse transform is defined as:

$$g(t) = \int_{-\infty}^{\infty} G(f)e^{-2\pi i ft} df.$$

This expression uses complex numbers in exponential form, which can be further split into cos and sin triangular functions to facilitate the actual calculation. This is a one-dimensional Fourier Transform operation that transforms a signal from time domain to frequency domain. When a signal is in the frequency domain, the amplitude of the function determines how much of it is in the signal and the phase determines the frequency components.

In U.S. Pat. No. 6,411,978 to Naveh et al. titled "Mechanism for block floating point FFT hardware support on a fixed point digital signal processor," a hardware mechanism is introduced to deal with the overflow problem in a digital signal processor while a block floating point Fast Transform is employed to improve signal to quantization noise ratio performance. In this disclosure, a general radix-2 Decimation In Time (DIT) FFT method is presented showing an output vector (c, d) in terms of an input vector (a, b) as follows:
$c=a+W_N^k \cdot b$ and $d=a-W_N^k \cdot b$ where all the numbers are general complex numbers.

Each output is the sum of two numbers, for example, c is the sum of a and $W_N^k \cdot b$, where the term $W_N^k$ is a "twiddle factor" defined as $W_N^k=e^{-2\pi j nk/N}$, j is an imaginary number and the magnitude of $W_N^k$ is unity. In the calculation, the product $W_N^k \cdot b$ can change the magnitude of the real and/or imaginary part of the complex number by a factor of $\sqrt{2}$. That is, in the computation of DIT FFT, the component under manipulation can grow up to $\sqrt{2}$ times the real and/or imaginary parts of the complex number b.

One problem that exists with the FFT computation involves the variation in the dynamic range of complex numbers. As used herein, the dynamic range is a range between the maximum possible value and the minimum possible value. In certain scenarios, the dynamic range can grow by a factor of up to 2. For example, in the mentioned output vector (c, d), the dynamic range of the absolute value of c and d are listed as follows:

$$\text{abs}(c) \leq 2 \cdot \max(\text{abs}(a), \text{abs}(b))$$

and $$\text{abs}(d) \leq 2 \cdot \max(\text{abs}(a), \text{abs}(b)).$$

When the dynamic range in a fixed point digital signal processor (DSP) grows, solutions are needed to overcome the overflow problem. The simplest solution is to divide each input vector by N, where N is the number of inputs. However, this solution results in low signal to quantization noise ratio (SQNR). A second solution is to divide each result of each operation by 2, however, this fails to obtain a high enough SQNR for most communications applications. A third solution is to use a block floating point technique such as block floating point (BFP) FFT. BFP FFT redoes the calculation whenever any overflows are detected. This approach improves the overall SQNR but sacrifices efficiency and introduces a measure of uncertainty with respect to the number of necessary cycles to accomplish a computation.

In U.S. Pat. No. 6,411,978, a loadable register that stores a threshold value for detecting the overflows is disclosed. The actual overflow detection can be controlled by a software program. Although it may be ideal to utilize programmable software to detect overflows, the time delays caused by the slow processing steps of the software hampers digital signal processing performance. Each of the above referenced patents are incorporated herein by reference as if set forth in full.

SUMMARY OF THE INVENTION

Methods and apparatuses for approximating an upper-bound limit for an absolute value of a complex number or norm of a two-element vector are disclosed In one aspect of the invention, a method for approximating an upper-bound limit for an absolute value of a complex number or norm of a two element vector is disclosed. The real part and the imaginary part of the complex number are initialized. The upper bound limit for the absolute values of the complex number is generated using an upper bound function means. A determination is made as to whether an overflow condition exists.

In another aspect, an apparatus for approximating an upper-bound limit for the absolute value of a complex number or the norm of a two-element vector is disclosed. The apparatus includes a comparator element and an upper-bound function circuit. The comparator element is configured to compare the absolute value of the real part and the imaginary part of the complex number. The upper bound function circuit is configured to outputs an upper bound limit according to an upper bound approximation algorithm.

These and other features, aspects, and embodiments of the invention are described below in the section entitled "Detailed Description."

BRIEF DESCRIPTION OF THE DRAWINGS

For a more complete understanding of the principles disclosed herein, and the advantages thereof, reference is now

DESCRIPTION OF EMBODIMENTS OF THE INVENTION

Figure 1:
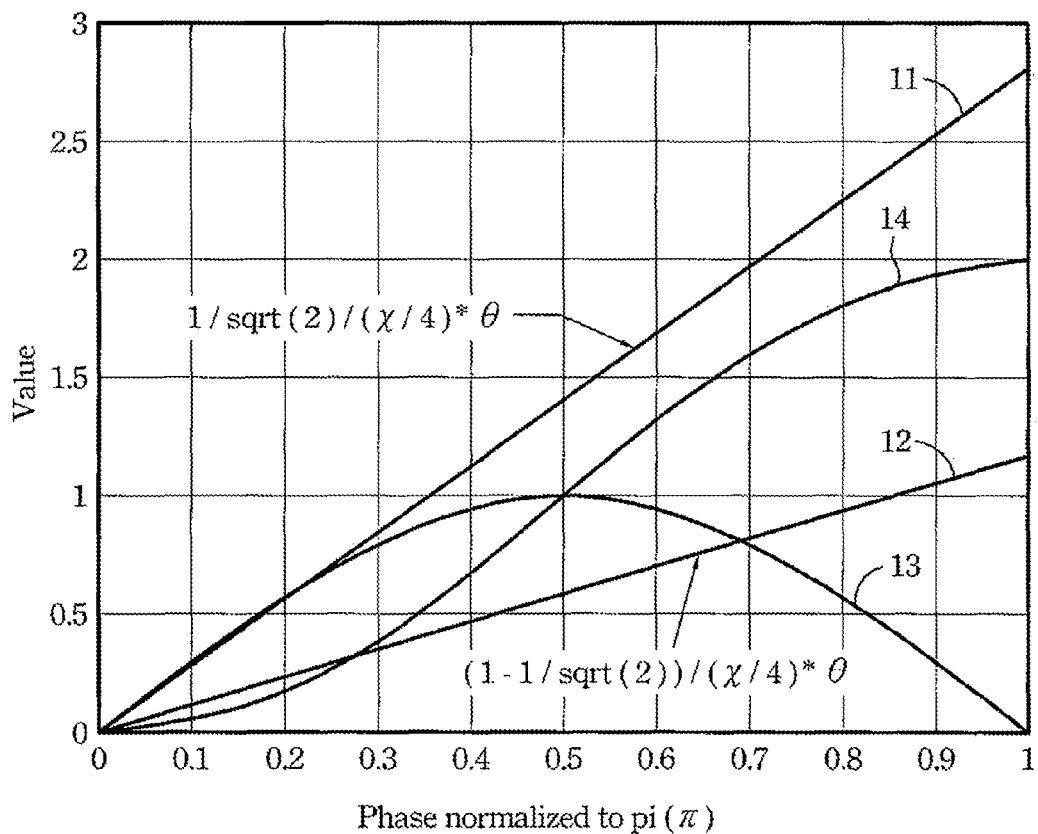
FIG. 1 is a simulation result of comparison among four functions with phase normalized to pi ($\pi$), in accordance with one embodiment.

Methods and apparatuses for approximating an upper-bound for an absolute value of a complex number or norm of a two-element vector are disclosed. It will be clear, however, that the present invention may be practiced without some or all of these specific details. In other instances, well known process operations have not been described in detail in order not to unnecessarily obscure the present invention.

Certain embodiments of this invention are implemented on a digital signal processing apparatus including a Digital Audio Broadcasting (DAB) system, a Digital Video Broadcasting (DVB) system, a DVB-handheld (DVB-H) system, DVB-Terrestrial (DVB-T), an Enhanced Definition Television (EDTV), or general digital signal processors (DSP).

In order to solve the overflow problems encountered during digital signal processing, certain embodiments of this invention provide a low cost and high performance solution (comprising a simplified and improved algorithm implemented by digital circuits) to calculate an upper-bound approximation of the absolute value of a complex number, or equivalently, the norm of a two-element vector. This can help save hardware costs in many applications where the signal processing algorithm requires computation of these kinds of values. Using the algorithms incorporated in certain embodiments of the present invention, an upper-bound limit for the absolute value of a complex number can be estimated and overflow problems can then be detected and solved.

Upper Bound Approximation Algorithm

The algorithm is implemented in two stages. During the first stage, information is gathered about the absolute value of the real part and the imaginary part of a complex number to determine whether the value for the real part is larger or smaller than that for the imaginary part. In the second stage, output can be generated to help detect an overflow situation and/or the approach of the upper-bound limit for the absolute value can be computed using an upper bound function of the algorithm.

The first stage (initialization stage) is essentially an initialization step where information about the absolute values of the real part and imaginary part of the complex number is obtained. The absolute values for the real and imaginary parts of a complex number are easy to determine since they are restricted to non-complex numbers, which can be natural numbers, integers, rational numbers or irrational numbers. Rational numbers are numbers can be in the form of p/q where p and q are integers. Irrational numbers are numbers that cannot be in p/q form. All non-complex numbers can be converted into binary code and the absolute values of a non-complex number can be readily determined (i.e. the absolute values of a negative integer in the form of binary codes can be determined by utilizing the 2's complement method). For example, in a four bit digital system, the integer number three is represented by "0011" and the negative integer number three is represented by "1101" using the 2's complement method which inverts those bits with a value of "1" to "0" and those bits with value of "0" to "1", and then adds an additional "1" to the end of the binary code expression. By adding the absolute value for integer number three ("0011") to the absolute value for negative integer number three ("1101"), we can examine the result as "0000" which is a zero for a four bit digital system. Similar methods can be applied to rational numbers and irrational numbers in order to determine absolute values for the real and imaginary parts of a complex number that are in those numerical formats.

The second stage applies an upper bound function configured to generate an output indicating the detection of an overflow condition or the approach of an upper-bound limit. After, a determination is made as to which component (i.e., real part or imaginary part) has the larger and smaller absolute values. The component with the smaller absolute value is multiplied by a factor of ($\sqrt{2}-1$) and then combined with the component with the larger absolute value to arrive at an upper-bound limit for the absolute value of the complex number. The relationship between the upper-bound and the complex number is described in the following equation:

$|A| \leq \max\{|x|,|y|\} + (\sqrt{2}-1)\cdot\min\{|x|,|y|\}$ where A is a complex number, x is the real part of A and y is the imaginary part of A.

Derivations of the Upper Bound Approximation Algorithm

Let A be a complex number with a real part x and an imaginary part y. The absolute value of the complex number A is equal to $\sqrt{x^2+y^2}$. As used herein, the complex number A is usually a normalized complex number. Therefore, the complex number A can be split into two segments, $|A|=|A|\cdot[\cos\theta+(1-\cos\theta)]=|x|+|A|\cdot(1-\cos\theta)$.

Since $|y|=|A|\cdot(\sin\theta)$, and for $\theta$ in the range of [0, $\pi/4$]. Therefore, a bound can be determined for $|A|$ using the expression $$|A| \leq |x| + \frac{|y|}{C}$$

provided that the $$\text{ratio} \frac{(\sin\theta)}{(1-\cos\theta)} \geq C,$$

where C is a constant that can be later determined.

To find the value of "C", FIG. 1 is referenced for $\theta$ in the range of [0, $\pi/4$]. Linear segments $$11\left(\frac{1/\sqrt{2}}{\pi/4}\cdot\theta\right) \text{ and } t\ 12\left(\frac{1-1/\sqrt{2}}{\pi/4}\cdot\theta\right)$$

are applied to approximate line 13 of function ($\sin\theta$) and 14 of function ($1-\cos\theta$). The expression can be recited as:

$$\sin\theta \geq \frac{1/\sqrt{2}}{\pi/4}\cdot\theta \geq \frac{1-1/\sqrt{2}}{\pi/4}\cdot\theta \geq (1-\cos\theta)$$

Then, we represent sin θ as the first term, (1−cos θ) as the fourth term, $$\frac{1-1/\sqrt{2}}{\pi/4} \cdot \theta$$

as the second term and the $$\frac{1/\sqrt{2}}{\pi/4} \cdot \theta$$

as the third term. The inequality equation can be expressed as:

$$\frac{(\sin\theta)}{(1-\cos\theta)} = \frac{1_{st}\ \text{term}}{4_{th}\ \text{term}} \geq \frac{2_{nd}\ \text{term}}{3_{rd}\ \text{term}} = \frac{1}{\sqrt{2}-1} \equiv C,$$

Then, the bound can be expressed as:

$$|A| \leq |x| + (\sqrt{2}-1)\cdot|y|.$$

For θ in the range of [π/4, π/2], by swapping the positions of |x| and |y|, a similar result can be expressed as:

$$|A| \leq |y| + (\sqrt{2}-1)\cdot|x|.$$

Finally, the results can be rewritten in following form:
$|A| \leq \max\{|x|,|y|\} + (\sqrt{2}-1)\cdot\min\{|x|,|y|\}$ where A is a complex number, is the real part of A and y is the imaginary part of A.

The upper bound of the norm of a complex number x+iy can then be formulated as:

$$\max\{|x|,|y|\} + (\sqrt{2}-1)\cdot\min\{|x|,|y|\}.$$

Concrete Implementation

Figure 2:
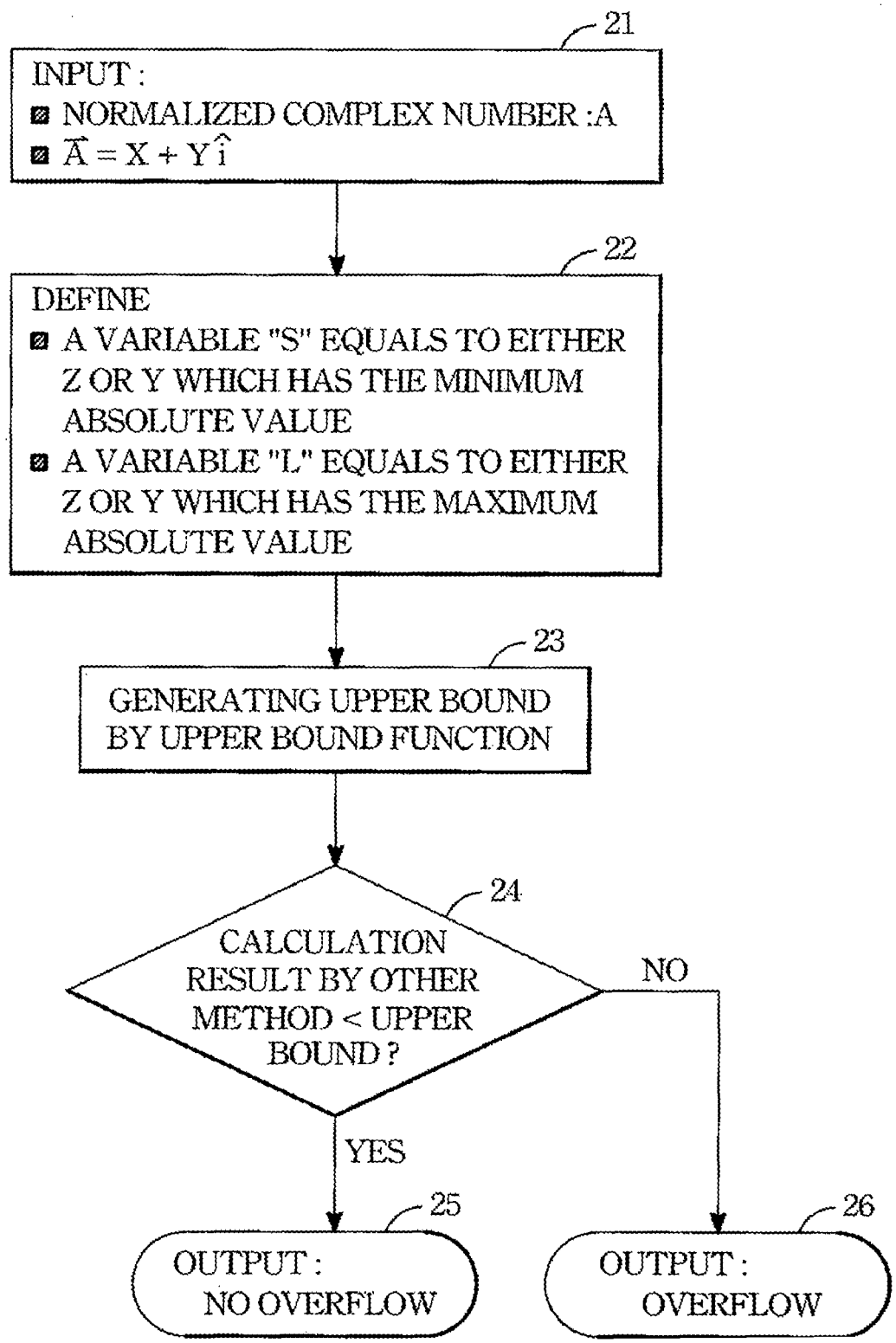
FIG. 2 is a flow diagram showing a method for approximating an upper bound limit utilizing an algorithm, in accordance with one embodiment.

Generally speaking, the Upper Bound Approximation Algorithm and its derivatives can be implemented using hardware (via digital circuitry) or software means. However, in practice, it is generally less difficult to implement the algorithm through hardware than through software. Referring to FIG. 2, a flowchart is provided that illustrates an algorithm for approximating the upper-bound for an absolute value of a complex number and the norm of a two-element vector, in accordance with one embodiment. Step 21 shows an input as being a normalized complex number (i.e., A) that contains two components x and y, where A=x+iy and x is the real part of the complex number and y is the imaginary part of the complex number. It should be understood, however, that the Upper Bound Approximation Algorithm can be utilize with all types of complex numbers (e.g., normalized, unnormalized, etc.) and that the normalized complex number input referenced above was presented here by way of example only and should not be interpreted as limiting the algorithm to just normalized complex number inputs That is, the algorithm can be readily modified to approximate the upper bound of any unnormalized complex numbers. In initialization step 22, variable "S" is equal to the x or y value with the lowest (minimum) absolute value, whereas, variable "L" is equal to the x or y value with the highest (maximum) absolute value. In one embodiment, variables "S" and "L" are data registers that can keep data temporarily or permanently. In another embodiment, variables "S" and "L" are outputs from a combination of logic circuits.

In step 23, variables "S" and "L" can be sent to an upper bound function block to determine whether the absolute value for the complex number exceeds the limitations specified by the algorithm. The upper bound function block utilizes the "S" and "L" variables to generate an upper bound limit for the absolute value of a complex number. The implementation of the upper bound function block will be described in greater detail in FIG. 3. Once the upper bound limit is generated by the upper bound function, the process moves to step 24 where a determination is made as to whether an absolute value of the complex number calculated using a second method exceeds the upper bound limit. When the absolute value, calculated using the second method, exceeds the upper bound limit the algorithm proceeds to step 26 where an output can be generated to indicate a detection of an overflow condition. When the absolute value, calculated using the second method, is less than the upper bound limit the algorithm proceeds to step 25 where an output can be generated to indicate that no overflow condition is detected.

As discussed above, non-complex numbers can be converted to binary codes and the absolute value of a non-complex number can also be easily determined. In one embodiment, a hardware implementation of initialization step 22 can be implemented using a 2's complement block and a comparator. When the 2's complement block detects a negative number, the 2's complement block can convert the negative value into a positive value. This value is then compared against the other positive number by the comparator. The same rule can be applied to the cases where both of the numbers are negative numbers. If both of the numbers were positive numbers, the 2's complement block would be not be used. If the relationship between real part and the imaginary part of the complex number is already predetermined, it may be unnecessary to make this comparison.

Figure 3:
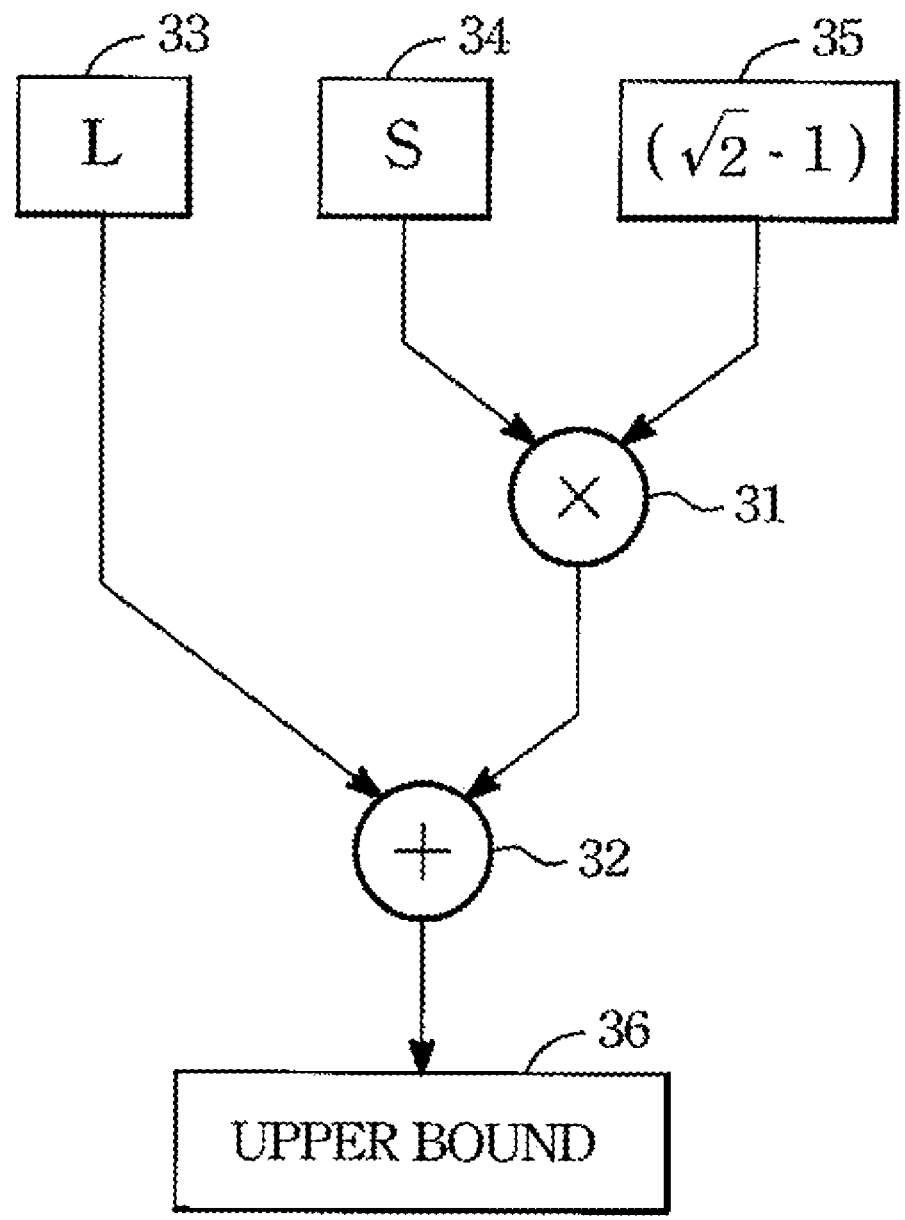
FIG. 3 is a process flowchart that how the upper bound function block is implemented to determine an upper bound limit for an absolute value of a complex number, in accordance with one embodiment.

FIG. 3 is a process flowchart that shows how the upper bound function block is implemented to determine an upper bound limit for a computed absolute value of a complex number, in accordance with one embodiment. As depicted herein, an upper bound function circuit is used to find an upper bound limit for the computed absolute value of a complex number or the computed norm of a two-element vector. The upper bound limit value provides a means for checking whether the absolute value calculated using a second method (integrated within the hardware or firmware of a digital signal processing component) indicates an overflow condition. This is accomplished by comparing the upper bound limit value with the absolute value calculated using the second method. From the flow diagram in FIG. 2, the "L" variable 33 (with the maximum or largest absolute value) and "S" variable 34 (with the minimum or smallest absolute value) of a complex number are both sent from initialization step 22 to generate an upper bound limit by using the upper bound function in step 23. The upper bound function utilizes the two inputs 33 ("L"), 34 ("S") and a parameter 35 ($\sqrt{2}-1$). The upper bound function further includes a multiplier element 31 used to multiply input 34 with parameter 35 to generate a multiplied product, and an adder element 32 to add the multiplied product from multiplier element 31 to input 33 to generate an upper bound limit output signal 36.

By applying the proposed embodiments of the present invention to a block-floating point algorithm in FFT or IFFT, the dynamic range of data at a certain stage can be monitored and the data can be scaled at a subsequent stage to maximize the utilization of dynamic range. As a result, truncation noise is minimized. Moreover, the upper bound can be used to monitor the dynamic range to ensure that no overflow condition exists. The operation of FFT/IFFT at a certain stage is merely a phase rotation preceded or followed by several additions depending on the radix and the algorithm. The original scheme to ensure no overflow is:

$$|x+iy|=\sqrt{x^2+y^2}\leq 1.$$

Since the square root can be difficult to compute, the present invention provides a substitute expression to replace the looser bound disclosed by the prior art and given as:

$$\sqrt{x^2+y^2}\leq \max\{|x|,|y|\}+(\sqrt{2}-1)\times\min\{|x|,|y|\}\leq 1.$$

The implementation of the upper bound approximation of the absolute value of a complex number is provided by certain embodiments of the present invention, a flexible solution can also be derived without departing from the spirit and scope of the present invention. This flexible solution involves replacing the parameter ($\sqrt{2}-1$) with another parameter, i.e. a number greater than parameter ($\sqrt{2}-1$), with released hardware computation requirement by a harsh number, i.e. one half which is given by following, $$\sqrt{x^2+y^2}\leq \max\{|x|,|y|\}+0.5\times\min\{|x|,|y|\}\leq 1.$$

In certain embodiments of the present invention, a method for determining an upper bound limit for an absolute value of a complex number is disclosed. The complex number includes a real part and an imaginary part. An absolute value is separately determined for each part and they are each processed separately. First, the part of the complex number having the minimum absolute value is determined. Next, the part of the complex number having a maximum absolute value is determined. Finally, the minimum absolute value and the maximum absolute values are input into an equation configured to calculate the desirable upper bound and to check if the calculations of the absolute values for the complex number have gone into overflow status. Therefore, every attempt to calculate the absolute value of any complex number can be checked to make sure that no overflow conditions exist (i.e., later calculations are within a specified range). Although the upper bound mentioned here is primarily used as a limiting value for overflow control purposes, it can also be used to roughly calculate the absolute value of the complex number if a tolerance is retained.

In other embodiments of the present invention, an apparatus for finding an upper bound limit of the computed absolute value of a complex number is disclosed. An upper bound function circuit includes an adder element and a multiplier element that are implemented using digital circuits. The content of a first register (i.e., "S" variable) is multiplied by a parameter (i.e., $\sqrt{2}-1$). The product of the multiplication step is then added to the content (i.e., "L" variable) of a second register. Then, the result of the addition step can be used as an upper bound limit of the computed absolute value of a complex number, which has a real part and an imaginary part as components. The content of the first register includes an absolute value of the part of the complex number that has the smaller or minimum value. The content of the second register includes an absolute value of the part of the complex number that has the greater or maximum value.

The embodiments described herein, can be practiced with other computer system configurations including hand-held devices, microprocessor systems, microprocessor-based or programmable consumer electronics, minicomputers, mainframe computers and the like. The embodiments can also be practiced in distributing computing environments where tasks are performed by remote processing devices that are linked through a network.

It should also be understood that the embodiments described herein can employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations that form part of the embodiments described herein are useful machine operations. The invention also relates to a device or an apparatus for performing these operations. The systems and methods described herein can be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

Certain embodiments can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A method implemented in a signal processing apparatus for approximating an upper-bound limit for the absolute value of a complex number or the norm of a two-element vector, wherein the signal processing apparatus includes an upper bound function circuit, the method comprising:

providing a complex number having a real part and an imaginary part associated with a signal to be processed;

computing a first absolute value of the real part and a second absolute value of the imaginary part;

through the upper bound function circuit of the signal processing apparatus, computing an upper-bound limit from the first and second absolute values, wherein computation of the upper-bound limit by the upper bound function circuit comprises:

comparing the first absolute value against the second absolute value to determine which of the first and second absolute values has a relatively smaller value, and which of the first and second absolute values has a relatively greater value;

computing a product result of multiplying the smaller value with a constant parameter; and obtaining the upper-bound limit as a result of adding the product result with the greater value;

computing a third absolute value of the complex number; and through the upper bound function circuit, comparing the third absolute value against the upper bound limit to detect the occurrence of an overflow condition.

2. The method of claim 1, further comprising:
generating an output to indicate the occurrence of the overflow condition when the third absolute value is greater than the upper bound limit.

3. The method of claim 1, wherein the step of computing the first absolute value of the real part and the second absolute value of the imaginary part comprises converting a negative value of any of the real and imaginary parts into a positive value through a 2's complement circuit.

4. The method of claim 1, wherein the complex number is normalized.

5. The method of claim 1, wherein the two-element vector is normalized.

6. The method of claim 1, wherein the parameter is about $(\sqrt{2}-1)$.

7. The method of claim 1, wherein the parameter is greater than $(\sqrt{2}-1)$.

8. The method of claim 1, wherein the parameter is greater than $(\sqrt{2}-1)$ and less than one half.

9. The method of claim 1, wherein the method is used in a digital broadcasting system, including the Digital Audio Broadcasting (DAB) system and/or the Digital Video Broadcasting (DVB) system.

10. The method of claim 1, wherein the method is used in a digital signal processor (DSP).

11. An apparatus for approximating an upper-bound limit for the absolute value of a complex number or the norm of a two-element vector, comprising:
a comparator element configured to compare a first absolute value of a real part of
a complex number against a second absolute value of an imaginary part of the complex number to determine which of the first and second absolute values has a relatively smaller value and which of the first and second absolute values has a relatively greater value; and
an upper bound function circuit configured to:
compute a product result of multiplying the smaller value with a parameter;
compute an upper-bound limit as a result of adding the product result with the greater value; and
compare a computed absolute value of the complex number against the upper bound limit to detect the occurrence of an overflow condition.

12. The apparatus of claim 11, wherein the comparator element comprises a 2's complement circuit configured to convert a negative number of any of the real and imaginary parts into a positive value.

13. The apparatus of claim 11, wherein the comparator element is configured to send the real part and the imaginary part with information indicating which of the first and second absolute values has the smaller value, and which of the first and second absolute values has the greater value.

14. The apparatus of claim 11, wherein the parameter is about $(\sqrt{2}-1)$.

15. The apparatus of claim 11, wherein the parameter is greater than $(\sqrt{2}-1)$.

16. The apparatus of claim 11, wherein the parameter is greater than $(\sqrt{2}-1)$ and less than one half.

17. The apparatus of claim 11, wherein the apparatus is used in a digital broadcasting system, including the Digital Audio Broadcasting (DAB) system and/or the Digital Video Broadcasting (DVB) system.

18. The apparatus of claim 11, wherein the apparatus is used in a digital signal processor (DSP).

19. The apparatus of claim 11, wherein the occurrence of the overflow condition is detected when the computed absolute value of the complex number is greater than the upper bound limit.

\* \* \* \* \*